US008290939B2

(12) United States Patent  
Bouillet et al.

(10) Patent No.: US 8,290,939 B2  
(45) Date of Patent: Oct. 16, 2012

(54) VISUALIZING QUERY RESULTS IN STREAM PROCESSING SYSTEMS

(75) Inventors: Eric Bouillet, Hawthorne, NY (US); Hanhua Feng, Hawthorne, NY (US); Anton V Riabov, Hawthorne, NY (US)

(73) Assignee: International Busines Machines Corporation, Armonk, NY (US)

( * ) Notice: Subject to any disclaimer, the term of this patent is extended or adjusted under 35 U.S.C. 154(b) by 219 days.

(21) Appl. No.: 12/827,419

(22) Filed: Jun. 30, 2010

(65) Prior Publication Data

US 2011/0302196 A1 Dec. 8, 2011

Related U.S. Application Data

(60) Provisional application No. 61/351,666, filed on Jun. 4, 2010.

(51) Int. Cl.  
*G06F 7/00* (2006.01)

(52) U.S. Cl. ......................... 707/722; 707/732

(58) Field of Classification Search .................. 707/722, 707/732  
See application file for complete search history.

(56) References Cited

U.S. PATENT DOCUMENTS

| | | | |
|---|---|---|---|
| 5,999,946 A * | 12/1999 | Bailis et al. ........................... | 1/1 |
| 6,633,867 B1 | 10/2003 | Kraft et al. | |
| 7,428,555 B2 | 9/2008 | Yan | |
| 2001/0021929 A1 | 9/2001 | Lin et al. | |
| 2002/0143742 A1 * | 10/2002 | Nonomura et al. ............... | 707/1 |
| 2007/0136254 A1 | 6/2007 | Choi et al. | |
| 2009/0106214 A1 | 4/2009 | Jain et al. | |
| 2009/0187541 A1 | 7/2009 | Hupfer et al. | |
| 2009/0228434 A1 | 9/2009 | Krishnamurthy et al. | |
| 2010/0088310 A1 * | 4/2010 | Daugherty et al. ............ | 707/722 |

OTHER PUBLICATIONS

Tao Yu et al. (Jul. 20-23, 2009). A System for Web-Based Interactive Real-Time Data Visualization and Analysis. The Computer Society, 2009 IEEE Conference on Commerce and Enterprise Computing (CEC '09). pp. 453-459, DOI 10.1109/CEC.2009.26.  
Wei Y. et al. (Apr. 24-26, 2006). RTSTREAM: real-time query processing for data streams. The Computer Society, Proceedings of the Ninth IEEE International Symposium on Object and Component-Oriented Real-Time Distributed Computing (ISORC 2006).  
Ying-Hui Kong et al. (Aug. 19-22, 2007). A Method for Continuous Query Over Data Stream using Wavelet Synopsis, Proceedings of the Sixth International Conference on Machine Learning and Cybernetics, Hong Kong, vol. 7, pp. 4119-4123.

\* cited by examiner

*Primary Examiner* — Cheyne Ly  
(74) *Attorney, Agent, or Firm* — Chau & Associates, LLC

(57) ABSTRACT

In a method for visualizing query results in stream processing systems, a visualization service receives a query from a client to visualize data in a stream processing application. The query is sent from the visualization service to a query-able operator of the stream processing application. At the query-able operator, an operation is performed using history data in the query-able operator to produce a first result that satisfies the query and the first result is sent to the visualization service. At the query-able operator, another operation is performed using new data received by the query-able operator to produce a second result that satisfies the query and the second result is sent to the visualization service. The first and second results are output from the visualization service to the client.

19 Claims, 5 Drawing Sheets

VISUALIZING QUERY RESULTS IN STREAM PROCESSING SYSTEMS

CROSS-REFERENCE TO RELATED APPLICATION

This application claims the benefit of U.S. Provisional Application No. 61/351,666, filed Jun. 4, 2010, the disclosure of which is incorporated by reference herein in its entirety.

GOVERNMENT INTERESTS

This invention was made with Government support under Contract No.: H98230-07-C-0383 awarded by the U.S. Department of Defense. The Government has certain rights in this invention.

BACKGROUND

1. Technical Field

The present invention relates to stream processing, and more particularly to processing new visualization queries for data within a running stream processing system.

2. Discussion of the Related Art

Stream processing is a technique to achieve high performance computing in a distributed system consisting of multiple computers. Stream-based applications include market data feed processing and electronic trading, network and infrastructure monitoring, fraud detection, and command and control in military environments. A stream processing application comprises a graph of stream processing operators, where nodes of the graph represent operators performing tasks, and directed edges of the graph represent data flowing between operators. A stream processing operator may be nothing more than a piece of code that produces a data value at its output every time it is given a data value at its input. Streaming data is usually organized as sequences of tuples flowing asynchronously from operator to operator. A tuple is a list of values with the same or different types. During its lifetime, a stream processing application is usually automated without any human interaction.

The flow graphs of most stream processing applications are acyclic. A stream processing application receives external data, such as stored raw data collected in advance or real-time data from sensors through source operators, and sends results through sink operators to storage spaces such as files and databases or other applications such as visualization tools.

Stream processing results are generally very large and generated in high speed. The results, for example, the internal states accumulated by a stream processing application, consist of a sequence of values of the same type or a sequence of tuples. To query and/or visualize a data stream, existing solutions store data streams in databases or other kinds of physical storage spaces. Client applications are then used to query the database to retrieve stored data streams of interest and visualize them.

For high performance stream processing, it is generally not possible to store all data because the states can change in a rate that is higher than what the mass storage can handle, and the total amount of data may exceed the existing storage space if a task runs for a long time. In addition, multiple client applications may want to visualize different data streams simultaneously, which further increases the load of the mass storage. Other reasons for not storing internal states may include complicated data structures and on-line processing requirements, as well as a demand for low latency.

BRIEF SUMMARY

Exemplary embodiments of the present invention provide a method and computer program product for visualizing query results in stream processing systems.

In the method, a visualization service receives a query from a client to visualize data in a stream processing application. The query is sent from the visualization service to a query-able operator of the stream processing application. At the query-able operator, an operation is performed using history data in the query-able operator to produce a first result that satisfies the query and the first result is sent to the visualization service. At the query-able operator, another operation is performed using new data received by the query-able operator to produce a second result that satisfies the query and the second result is sent to the visualization service. The first and second results are output from the visualization service to the client.

DETAILED DESCRIPTION

In accordance with an exemplary embodiment of the present invention there are provided new stream processing operators that can receive queries from users in addition to ordinary data streams from other operators or external data sources. These operators store dynamic application states in memory. After a query is received by such a query-able operator, historical data is checked and selected results are sent to the output immediately. Then, the query is stored within this operator as a standing query. Any new data from the input data streams or updates of operator states will be checked against the set of standing queries for updating the query results. Consequently, after sending a query to such a query-able operator, with very short latency, a visualization tool can show not only historical data but also continuous real-time updates throughout the entire lifetime of the standing query.

Each query may have a globally unique query identifier (id) to support multiple query sessions and/or multiple users. A routing service can route a query result tuple to the visualization tool that initiates the corresponding query. For web-based visualization services, this routing service may be implemented by a web server. Since query operations are performed within stream processing operators and no application-specific data filtering operation is needed on the visualization side, the visualization tool is reusable from application to application, allowing developers to focus on development in a single stream processing platform.

In short, the present invention introduces human interaction to a stream processing flow, allowing users to interactively choose a subset of information or states accumulated in the stream processing flow for visualization. Effectively, the present invention allows humans to be actively integrated into a stream processing flow as a component, making the entire application flow a close-looped system.

Figure 1:
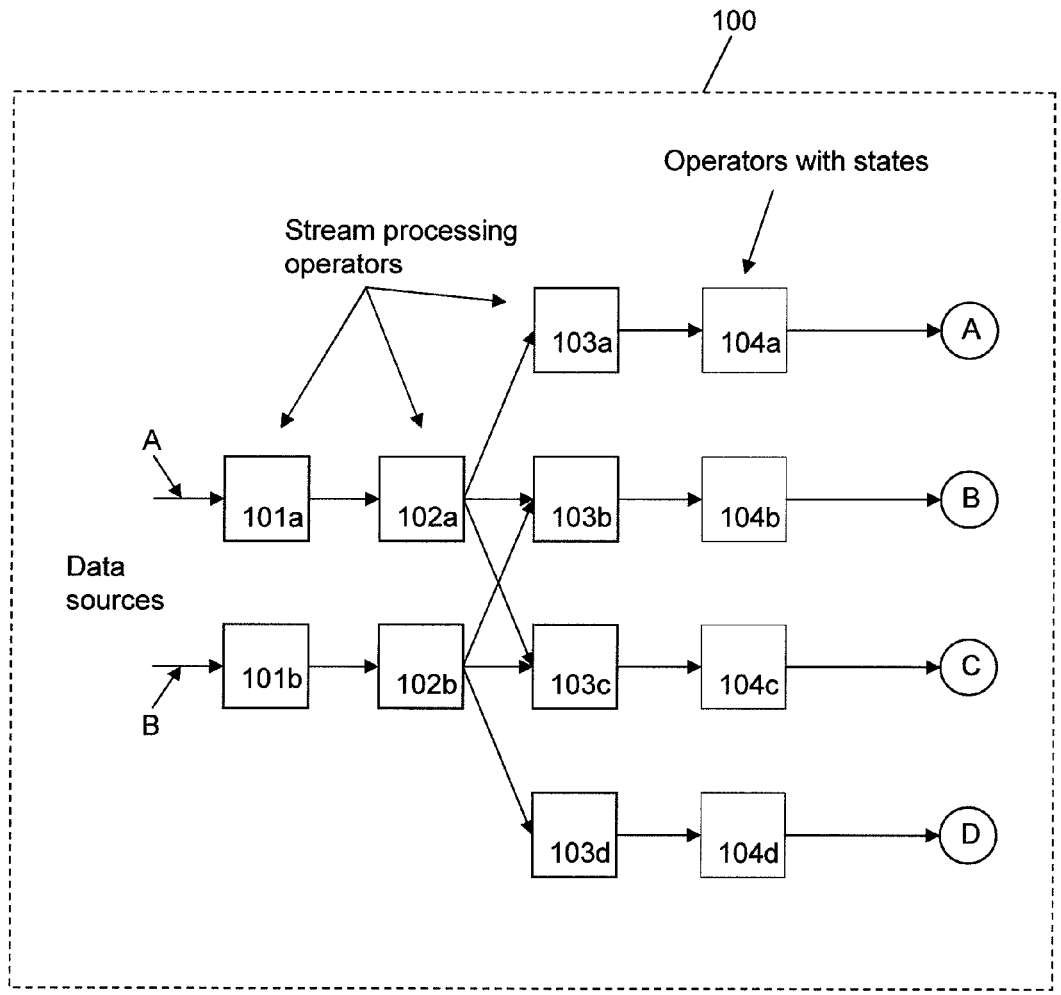
FIG. 1 illustrates an example of a stream processing flow graph and a visualization service according to an exemplary embodiment of the present invention.
Figure 1:
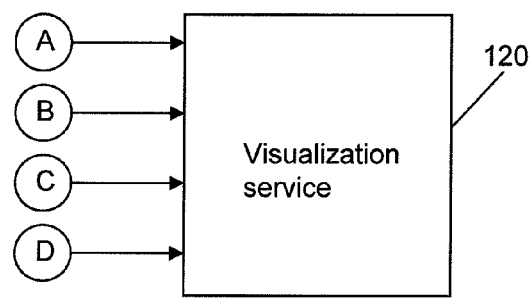

FIG. 1 is an example of a flow graph 100 of a stream processing application that receives two data streams A and B from external data sources. Nodes 101a-104d of the graph 100 are stream processing operators performing tasks, and directed edges (arrows pointing right) of the graph 100 represent data flowing between operators. Data is pushed from operator to operator in tuples. Some of the operators 104a-104d may maintain historical data and current states. General stream processing operators 101a-103d and those with states 104a-104d may be analytics and aggregation operators, just to name a few.

Visualization service 120 applies aspects of the present invention as described with reference to FIG. 2. For example, flow graph 100 may be an application that processes streams of data that are produced by sensors in an automobile highway network, where the data sources may be cars that cross sensors, the state of traffic lights, weather conditions on the roads, etc. In this example, each operator would perform a function on the steam of data, such as aggregating inputs from all the sensors on a particular road, determining if any particular road is above a defined level of congestion, etc.

In operation, flow graph 100 may be compiled into a stream processing application that may be run on a computing environment that is capable of executing a realtime stream processing platform, such as InfoSphere Streams® (previously known as System S), offered by International Business Machines Corporation, Armonk, N.Y. Details regarding InfoSphere Streams™ are provided in various IBM™ publications including, for example, a publication entitled "IBM InfoSphere Streams, Redefining Real Time Analytics," by Roger Rea and Krishna Mamidipaka, published February, 2010. The InfoSphere Streams™ platform uses a high-level programming language referred to as the Stream Processing Language (SPL; formerly known as SPADE). SPADE is described in "SPADE: System S Declarative Stream Processing Engine," Gedik et al., SIGMOD, Jun. 9-12, 2008, pp. 1123-1134. Further details regarding SPL are described in an IBM® Research Report entitled "SPL Stream Processing Language Specification," Hirzel et al., RC24897 (W0911-044), Nov. 5, 2009. InfoSphere Streams™ and the Stream Processing Language support distributed data stream processing applications that can span a number of computing nodes. The Stream Processing Language declarative language is used, in one example, to program these multi-operator applications. Stream Processing Language's stream-centric design implies a language where the basic building block is a stream. Stream Processing Language's operator-based programming is focused on designing the application around the smallest possible building blocks necessary to deliver the computation an application is designed to perform.

Figure 2:
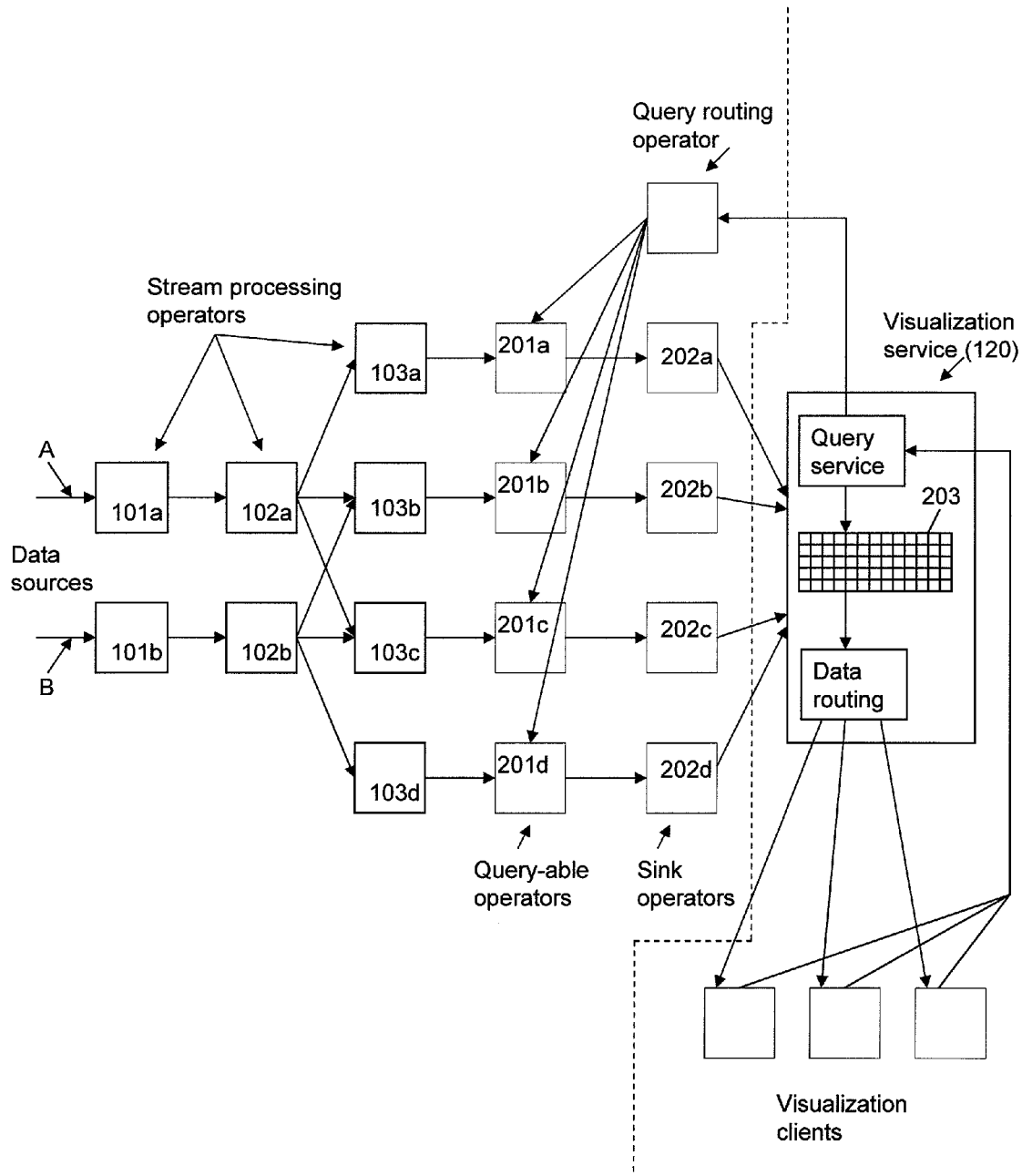
FIG. 2 illustrates part of the stream processing flow graph of FIG. 1 with an exemplary embodiment of the present invention that interactively visualizes streaming data.

FIG. 2 illustrates the stream processing flow graph 100 of FIG. 1 using an exemplary embodiment of the present invention to interactively visualize streaming data. The stream processing flow graph in FIG. 2 is similar to that shown in FIG. 1, except that the state-keeping operators 104a-104d have been replaced with query-able operators 201a-201d and sink operators 202a-202d are included. A query-able operator is a stream processing operator that stores and performs queries against historical and real-time updates, and a sink operator is a stream processing operator that forwards the results to the visualization service. The stream processing flow of FIG. 2 is on the left side of the dashed lines, while visualization components are on the right side of the dashed lines.

As shown in FIG. 2, the query-able operators 201a-201d each receive a query stream from a query routing operator which in turn receives queries from the visualization service 120. The query routing operator is a stream processing operator that locates the query-able operator(s) according to the query parameters and the operator id(s) specified in a received query tuple and forwards the query to one or more query-able operators. The output streams of these operators 201a-201d are sent to the visualization service 120 through the sink operators 202a-202d. The visualization service 120 is used by multiple clients, and possibly by multiple users.

A visualization client may be software that has the following capabilities, three-dimensional (3D) viewer, graph generator, etc. For web-based visualization tools, the visualization service 120 runs within a web server whereas the visualization clients run inside browsers. The web server is a standalone program that usually supports modules and/or plugins, for example, and the visualization service 120 can run as a module within this web server. Alternatively, we can consider the web server as a supporting library for the visualization service. Considered as a single piece, the web service and the visualization service 120 constitute a standalone program communicating with other programs of the stream processing application.

The visualization service 120 includes a query service that is responsible for forwarding visualization requests from the visualization clients to the query-able operators 201a-201d through the query routing operator. This component also records the query in a routing table 203 for standing queries. The visualization service 120 also includes a data (i.e., query results) routing service that is responsible for forwarding visualization data received from stream processing operators to the visualization client that has initiated the corresponding query, according to the records in the routing table 203.

A procedure of processing a query in accordance with an exemplary embodiment of the present invention is as follows.

A user sends a query to the visualization service 120 by operating a visualization client through an input device such as a keyboard or mouse (1). Continuing the example above of a stream processing application for steaming data from an automobile highway, the user may send a query requesting a display of road blocks in a highway network that have more than x cars in the previous 60 seconds. The visualization service 120 sends a query tuple to the query routing operator and logs its query id into the routing table 203 (2). The query routing operator broadcasts the query to one, a subset of, or all of the query-able operators 201a-201d (3). In the example above, the query may be sent to operators that aggregate the numbers of cars on a block of each road. An optional query type or operator id can be used to decide to which operators the query will be sent. The query-able operators 201a-201d perform the query against historical data and send query results to the sink operators 202a-202d (4). The query-able operators 201a-201d store the query as a standing query and send subsequent updates as new data come in from upstream operators (e.g., operators to the left of the query-able operators). The query results and updates contain the original query id. The sink operators 202a-202d then forward query results to the visualization service 120 (5). The visualization service 120 uses the query id in the received query tuple to find in its routing table 203 the client who sent this query, and re-routes the data to the client (6). This procedure will also be described with reference to FIG. 4.

To better manage the lifetime of the standing queries, the query-able operators 201a-201d maintain an expiration time for each query. The expiration time of a standing query is its timestamp plus a global timeout value. Alternatively, the client can provide a different timeout value for each query through a timeout attribute in the query tuple. When a query is added to the set of standing queries, its timestamp is updated with the current time. Expired standing queries are deleted. Optionally, a query tuple may also contain an additional special new/delete/extend attribute enabling the following special operations:

(a) Delete a standing query. A client can send a special query with this attribute set to "delete" to remove its previous query of the same query id from the set of standing queries in the query-able operators 201*a*-201*d*.

(b) Extending the timeout. A client can send a special query with this attribute set to "extend" to update the timestamp of the standing query with the same query id, and then the expiration time of this standing query is extended.

Figure 3:
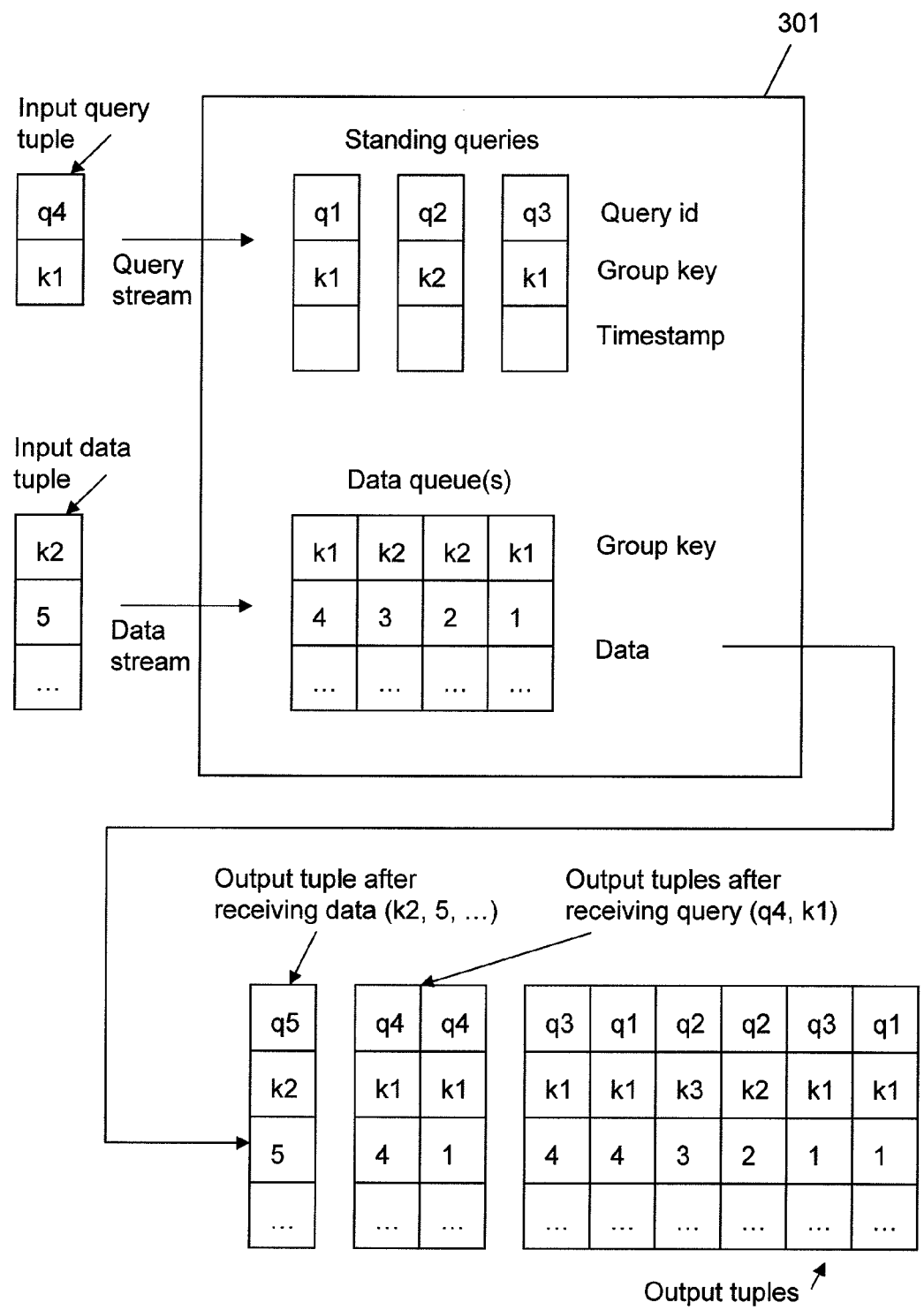
FIG. 3 illustrates a query-able operator and how it works according to an exemplary embodiment of the present invention.

FIG. 3 shows a query-able operator 301 according to an exemplary embodiment of the present invention. As discussed above, the query-able operator 301 is an operator in the stream processing application, and as such it is a unit of software running on a node that receives input data, processes that data according to functionality defined by the stream processing source code for the operator, and outputting the results to the next unit in the data stream. Unlike other operators in known systems, while processing data, query-able operator 301 is able to receive a new query and to include this query into its operation to generate results. In embodiments of the present invention, the additional query would be used for visualization of information that is the result of that query.

The query-able operator 301 accepts two input streams: a single data stream (for input data tuples) and a single query stream (for input query tuples). The query-able operator 301 stores a finite history of data. The data history can be stored in data structures such as a global first-in-first-out (FIFO) queue, or in multiple separate FIFO queues, each for a single group. In a typical example of the multiple-group case, each group has an associated group id, and a data tuple received from the data stream is appended only to the queue whose group id equals a data key attribute in the tuple. In this case, the data key is considered as part of query parameters. A query received from the query stream of a query-able operator 301 is stored in a list of standing queries. Effectively, in this example, the query-able operator 301 is a join between a data window (the history) and a dynamic set (standing queries).

In general, for performance reasons, the query received in a query tuple contains only a set of parameters. It is better not to include code that needs to be interpreted or compiled: the query algorithms themselves can be implemented within the query-able operators. However, a query-able operator is free to allow anything it can handle in the query tuple as query parameters: from some simple expressions as constraints or code written in a full-fledged query language.

A query tuple may have the following attributes: (1) a globally unique query id; (2) query parameters such as a data key; (3) a new/delete/extend attribute and/or a timeout attribute; or (4) an attribute to store an operator id (or a set of operator ids) if two of more query-able operators are used in the same application flow.

In the example shown in FIG. 3, upon receiving a non-special query tuple, the query-able operator 301 extracts the group key value and outputs all historical data tuples with the same group key value. The query id (and the operator id, if any) is added to the output as an additional attribute. Then, the query tuple is stored in the set of standing queries. When a new data tuple is received, it is stored in the data queue and is compared against all standing queries. If the data tuple matches one of the standing queries, this data tuple is sent to the output immediately with the query id (and the operator id, if any) attached. If the input data tuple matches two or more standing queries, it is replicated to the output for each standing query. Alternatively, to save communication bandwidth, the entire set of matching query ids can be attached to a single data output to avoid duplication. Further, to show only data from a single group at a time, the query received from the query stream of the query-able operator 301 contains the group key of the data group to be visualized. Therefore, each output tuple of the query-able operator 301 contains a query id, a group key, and data retrieved from the data queues.

The removal of out-dated data tuples in the query-able operator 301 may follow the FIFO order whereas the queries in the dynamic set are removed by the timeout mechanism and special "delete" and "extend" queries. The removal of queries in the query-able operator 301 may not follow a FIFO order.

Figure 4:
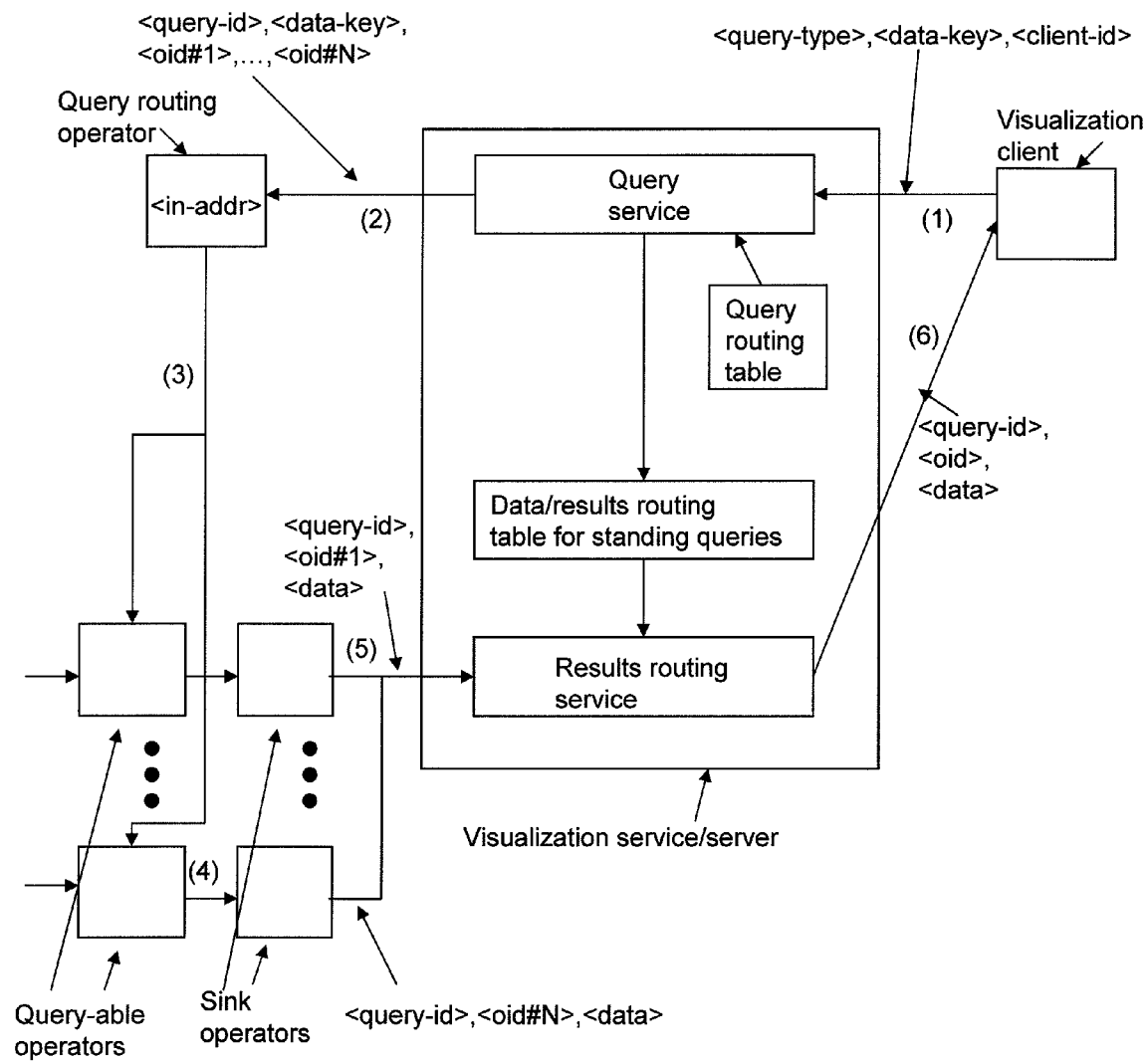
FIG. 4 illustrates a data flow diagram for a visualization service according to an exemplary embodiment of the present invention.

FIG. 4 illustrates a data flow diagram for a visualization service according to an exemplary embodiment of the present invention. As shown in FIG. 4, a visualization client (e.g., a person operating a computer subscribing to the visualization service) sends a tuple <query-type>,<data-key>,<client-id> to the query service (1), where <query-type> defines the type query class, and <data-key> describes the actual query parameters. In other words, the actual query is defined by the pair (<query-type>,<data-key>). The client id (or session id) is the id of the client session. As the query algorithms are in general implemented within the query-able operators, the <query-type> is usually an id used by the query service to determine the set of query-able operators to which this query should be sent. The data key in this example is the sole query parameter sent to the query-able operator(s).

The query service sends a tuple <query-id>,<data-key>, <oid#1>, . . . <oid#N> to the query routing operator (2). In other words, submit the query <query-id>, with queried data key <data-key> and list of operators expected to generate result streams (oid1-oidN) to the query routing operator. The address of the query routing operator and the ids of the query-able operators (<oid1#> . . . <oid#N>) are found in a query routing table (e.g., the standing query routing table) of the visualization service, and the query id <query-id> is uniquely generated by the visualization service. This query then becomes a standing query, and its query id and the client session id are stored in the data/results routing table and shared with a data/results routing service.

After query-able operators (not shown) receive the queries from the query routing operator (3), they continuously send query results <query-id>,<oid#1>,<data> to <query-id>, <oid#N>,<data> (including both historical and real-time data) to sink operators (4) and the sink operators forward these tuples to the visualization service (5). As shown, a result tuple contains the query id, an operator id (if multiple query-able operator ids are used), and query results.

After receiving the result tuples, the results routing service finds the client session id from the routing table, and re-routes data (e.g., <query-id>,<oid#1>,<data>) to the correct client session (i.e., the client that initiated the query) (6). In other words, it finds an appropriate standing query instance according to the tuple's <query-id> and <oids>, and routes the data to the visualization client who initiated this standing query.

Figure 5:
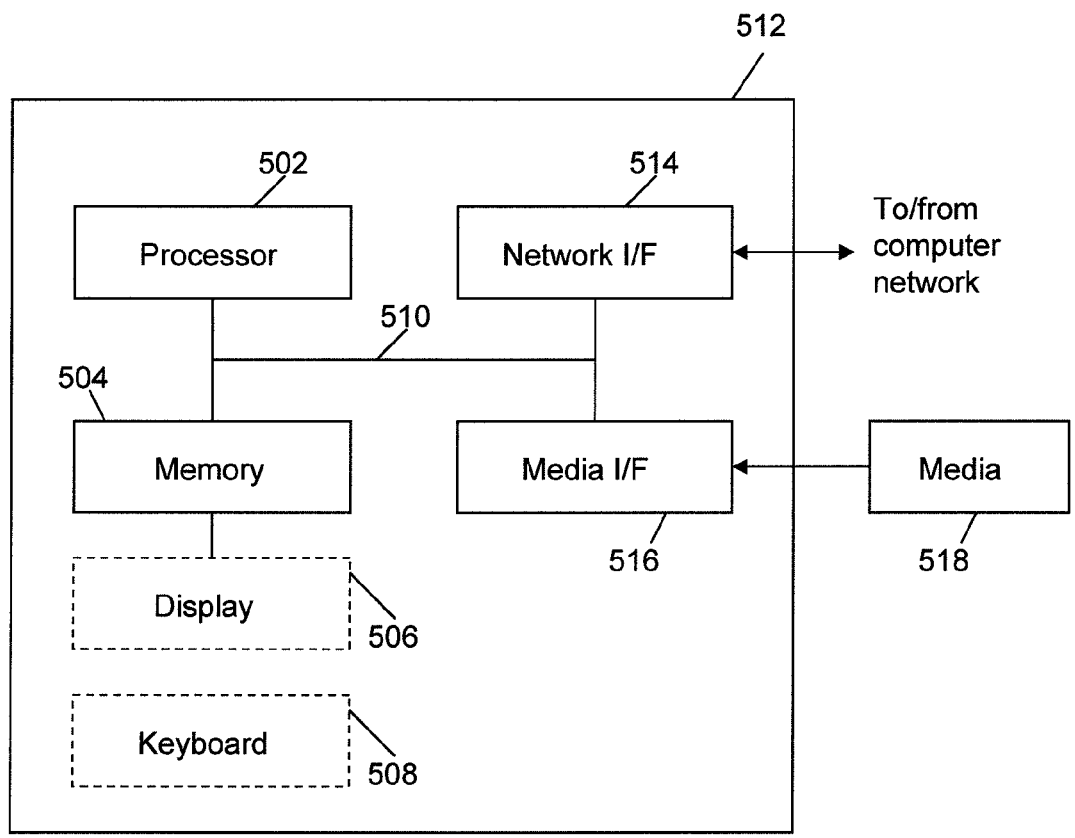
FIG. 5 illustrates an apparatus for implementing exemplary embodiments of the present invention.

An implementation of an exemplary embodiment of the present invention may make use of software running on a general-purpose computer or workstation. With reference to FIG. 5, such an implementation might employ, for example, a processor 502, a memory 504, and an input and/or output interface formed, for example, by a display 506 and a keyboard 508.

The term "processor" as used herein is intended to include any processing device, such as, for example, one that includes a central processing unit (CPU) and/or other forms of processing circuitry. Further, the term "processor" may refer to more than one individual processor. The term "memory" is intended include memory associated with a processor or CPU, such as, for example, RAM, ROM, a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer).

The processor 502, memory 504, and input and/or output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing exemplary embodiments of the present invention may be stored in one or more of the associated memory devices (for example, read-only memory (ROM), fixed or removable memory) and, when ready to be utilized, loaded in part or in whole (for example, into random access memory (RAM)) and executed by a CPU. Such software could include, but is not limited to, firmware, resident software, microcode, and the like.

As shown in FIG. 5, examples of a computer readable medium having computer readable program code for carrying out aspects of the present invention embodied thereon may include media 518 and memory 504.

A data processing system suitable for storing and/or executing program code may include at least one processor 502 coupled directly or indirectly to memory elements 504 though system bus 510. The memory elements can include local memory employed during actual execution of the program code, bulk storage, and cache memories which provide temporary storage of at least some program code to reduce the number of times code must be retrieved from bulk storage during execution.

Input and/or output or I/O devices (including but not limited to keyboards 508, displays 506, pointing devices, and the like) can be coupled to the system either directly (such as via bus 510) or through intervening I/O controllers.

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving, at a visualization service, a first query from a client to visualize data in a stream processing application, wherein the stream processing application comprises a plurality of operators that are connected to process a stream of input data, wherein each operator comprises executable software, wherein one or more of the operators is a query-able operator that contains functionality to receive new queries during operation;
   sending the first query from the visualization service to a query-able operator of the stream processing application;
   performing, at a query-able operator, an operation using history data in the query-able operator to produce a first result that satisfies the first query and sending the first result to the visualization service;
   receiving new data at the query-able operator, and, in response, performing an operation using the new data to produce a second result that satisfies the first query and sending the second result to the visualization service;
   outputting, from the visualization service, the first and second results to the client; and
   receiving a second query from another client at the visualization service, wherein the first and second queries have different client ids, wherein a client id indicates where results satisfying its corresponding query are to be sent, so that results of each query are forwarded to a single client.

2. The method of claim 1, wherein the outputting comprises displaying the first and second results to the client.

3. The method of claim 2, wherein the first and second results are displayed to the client via an interactive graphical user interface (GUI).

4. The method of claim 1, wherein the new data comprises real-time data.

5. The method of claim 1, further comprising storing the first query as a standing query in the query-able operator, wherein the query-able operator joins tuples of the standing query and data in the query-able operator.

6. The method of claim 1, wherein the query-able operator receives a data input stream and a query input stream.

7. The method of claim 1, wherein the first query is assigned a unique id by the visualization service and the unique id is stored in a routing table in the visualization service.

8. The method of claim 1, wherein the query-able operator maintains a set of standing queries, a standing query being a query received from a client, and an output stream of the query-able operator includes only data selected by at least one of the standing queries.

9. The method of claim 1, wherein the query-able operator generates results in response to the new data matching the first query or the new data having its internal state changed by the query-able operator and the changed internal state matches the first query.

10. The method of claim 1, further comprising storing the first query as a standing query in the query-able operator, wherein the standing query has an expiration time defined by a global timeout value or a timeout attribute in the first query.

11. The method of claim 10, further comprising extending the expiration time in response to an extend query tuple received by the query-able operator.

12. The method of claim 1, further comprising storing the first query as a standing query in the query-able operator and deleting the standing query in response to a delete query tuple received by the query-able operator, or the expiration of a timeout value.

13. A method, comprising:
   receiving, at a visualization service, a first query from a client to visualize data in a stream processing application, wherein the stream processing application comprises a plurality of operators that are connected to process a stream of input data, wherein each operator comprises executable software, wherein one or more of the operators is a query-able operator that contains functionality to receive new queries during operation;
   sending the first query from the visualization service to a query-able operator of the stream processing application;
   performing, at a query-able operator, an operation using history data in the query-able operator to produce a first result that satisfies the first query and sending the first result to the visualization service;
   receiving new data at the query-able operator, and, in response, performing an operation using the new data to produce a second result that satisfies the first query and sending the second result to the visualization service;
   outputting, from the visualization service, the first and second results to the client; and
   storing the first query as a standing query with the client id of the client who initiated this query in the visualization service, wherein the output of the query-able operator comprises a query identifier (id) of the first query, the method further comprising, routing, at the visualization service, the output of the query-able operator to the client who initiated the query based on whether the query id in the output matches that of the standing query.

14. The method of claim 1, wherein data in the query-able operator is divided into multiple groups by a group key such that the history data and new data of a group are retrievable by a query comprising a query id and a group key.

15. A computer program product, comprising:
   a computer readable storage medium having computer readable program code embodied therewith, the computer readable program code comprising:
   computer readable program code configured to perform the steps of:
   receiving, at a visualization service, a first query from a client to visualize an output of the stream processing application, wherein the stream processing application comprises a plurality of operators, including a query-able operator, that are connected to process a real time stream of input data, wherein each operator comprises executable software;
   sending the first query from the visualization service to the query-able operator;
   receiving, at the visualization service, a first result of an operation performed at the query-able operator using the real time data, the first result satisfying the first query; and
   outputting, from the visualization service, the first result to the client; and
   receiving a second query from another client at the visualization service, wherein the first and second queries have different client ids, wherein a client id indicates where results satisfying its corresponding query are to be sent, so that results of each query are forwarded to a single client.

16. The computer program product of claim 15, wherein the query-able operator receives a data input stream and a separate query input stream.

17. The computer program product of claim 15, further comprising:
   computer readable program code configured to perform the steps of:
   receiving and processing a stream of data at the query-able operator to produce history data;
   performing, at the query-able operator, an operation using the history data in the query-able operator to produce a second result that satisfies the first query and sending the second result to the visualization service; and
   outputting, from the visualization service, the second result to the client.

18. A computer program product, comprising:
   a computer readable storage medium having computer readable program code embodied therewith, the computer readable program code comprising:
   computer readable program code configured to receive and process a stream of data at a query-able operator in a stream processing application to produce history data, wherein the stream processing application comprises a plurality of operators, including the query-able operator, that are connected to process a steam of input data, wherein each operator comprises executable software;
   computer readable program code configured to receive, at a visualization service, a query from a client to visualize data in the stream processing application;
   computer readable program code configured to send the query from the visualization service to the query-able operator;
   computer readable program code configured to perform, at the query-able operator, an operation using the history data in the query-able operator to produce a first result that satisfies the query and send the first result to the visualization service; and
   computer readable program code configured to store the query as a standing query with the client id of the client who initiated this query in the visualization service, wherein the output of the query-able operator comprises a query identifier (id) of the query, the computer readable program code further configured to, route, at the visualization service, the output of the query-able operator to the client who initiated the query based on whether the query id in the output matches that of the standing query.

19. The computer program product of claim 18, further comprising:
   computer readable program code configured to receive and process a stream of real-time data at the query-able operator; and
   computer readable program code configured to perform, at the query-able operator, an operation using the real-time data to produce a second result that satisfies the query and send the second result to the visualization service.

* * * * *